United States Patent
Amico et al.

(10) Patent No.: US 10,187,539 B2
(45) Date of Patent: Jan. 22, 2019

(54) SECURE DOCUMENT PRINTER

(71) Applicant: Xerox Corporation, Norwalk, CT (US)

(72) Inventors: Mark S. Amico, Pittsford, NY (US); William N. Vogt, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 14/850,619

(22) Filed: Sep. 10, 2015

(65) Prior Publication Data

US 2017/0078508 A1    Mar. 16, 2017

(51) Int. Cl.
| | |
|---|---|
| *H04N 1/00* | (2006.01) |
| *H04N 1/32* | (2006.01) |
| *G06F 3/12* | (2006.01) |
| *H01F 7/16* | (2006.01) |

(52) U.S. Cl.
CPC ....... *H04N 1/00925* (2013.01); *G06F 3/1222* (2013.01); *G06F 3/1238* (2013.01); *H01F 7/1638* (2013.01); *H04N 1/00411* (2013.01); *H04N 1/3263* (2013.01); *H04N 1/32662* (2013.01); *H04N 2201/0094* (2013.01); *H04N 2201/3222* (2013.01); *H04N 2201/3246* (2013.01)

(58) Field of Classification Search
None
See application file for complete search history.

(56) References Cited

U.S. PATENT DOCUMENTS

| | | | | |
|---|---|---|---|---|
| 5,752,697 | A * | 5/1998 | Mandel | B65H 39/10 270/58.18 |
| 2002/0027160 | A1* | 3/2002 | Hara | G06Q 10/02 235/375 |
| 2007/0244821 | A1* | 10/2007 | Matsunaga | H04N 1/4426 705/57 |
| 2009/0066973 | A1* | 3/2009 | Robinson | H04N 1/00954 358/1.4 |
| 2011/0074541 | A1* | 3/2011 | Jones | G07C 9/00103 340/5.61 |
| 2013/0332194 | A1* | 12/2013 | D'Auria | G06F 19/322 705/3 |
| 2015/0115622 | A1* | 4/2015 | Burdenko | E05B 47/0001 292/138 |

* cited by examiner

*Primary Examiner* — Lennin R Rodriguezgonzalez

(57) ABSTRACT

A printer and method for printing a secure document are disclosed. For example, the printer includes a controller for receiving an indication that a print job contains the secure document, a lock on a printer door, wherein the lock is electrically coupled to the controller, wherein the lock is engaged by the controller after receiving the indication that the print job contains the secure document and the lock is disengaged when the print job is completed successfully and a user interface in communication with the controller for receiving a security code to disengage the lock when print job is interrupted due to an error.

19 Claims, 4 Drawing Sheets

SECURE DOCUMENT PRINTER

The present disclosure relates generally to print job security and, more particularly, to an apparatus and method for securely printing a document.

BACKGROUND

Some documents require a high level of security when being printed. For example, the document may contain personal information, sensitive financial information, highly confidential information, and the like. These documents cannot be printed on traditional printers as anyone can take the printed documents from the paper tray.

Some printers use a secured paper tray. For example, the printed documents are outputted into a locked or secured paper tray that requires an individual with a key to open the paper tray to obtain the printed documents. However, other portions of the printer are not secure. For example, individuals may stop a printing job and access compartments within the printer during a paper jam to obtain some of the secure documents. As a result, even with secured paper trays, some documents may still be accessible.

SUMMARY

According to aspects illustrated herein, there are provided a printer and method for printing a secure document. One disclosed feature of the embodiments is a printer that comprises a controller for receiving an indication that a print job contains the secure document, a lock on a printer door, wherein the lock is electrically coupled to the controller, wherein the lock is engaged by the controller after receiving the indication that the print job contains the secure document and the lock is disengaged when the print job is completed successfully and a user interface in communication with the controller for receiving a security code to disengage the lock when print job is interrupted due to an error.

Another disclosed feature of the embodiments is a method for printing a secure document. The method comprises receiving, by a processor of a printer, an indication that a print job contains the secure document, locking, by the processor, a lock on all customer printer door in response to the indication that the print job contains the secure document, determining, by the processor, that an error has occurred during the print job and receiving, by the processor, a security code to clear the error and disengage the lock on each one of the all customer accessible printer doors.

BRIEF DESCRIPTION OF THE DRAWINGS

The teaching of the present disclosure can be readily understood by considering the following detailed description in conjunction with the accompanying drawings, in which.

To facilitate understanding, identical reference numerals have been used, where possible, to designate identical elements that are common to the figures.

DETAILED DESCRIPTION

The present disclosure broadly discloses a printer and method for printing a secure document. As discussed above, some documents require a high level of security when being printed. For example, the document may contain personal information, sensitive financial information, highly confidential information, and the like. These documents cannot be printed on traditional printers as anyone can take the printed documents from the paper tray Some printers use a secured paper tray. For example, the printed documents are outputted into a locked or secured paper tray that requires an individual with a key to open the paper tray to obtain the printed documents. However, other portions of the printer are not secure. For example, individuals may stop a printing job and access compartments within the printer during a paper jam to obtain some of the secure documents. As a result, even with secured paper trays, some documents may still be accessible.

Embodiments of the present disclosure provide additional security to the printer. For example, all of the customer accessible printer doors, other than the input paper trays where paper is refilled in the printer, may be locked with an electro-mechanical lock or mechanism when a print job is indicated as being a secure document. Notably, the locks are not mechanical locks that require a physical key that is inserted into a key hole. Physical keys can easily be copied or used by any individual that may possess the physical key.

To illustrate, when a printer jams any individual may open the printer doors to access papers that are stuck inside of the printer. Some of the papers may have information printed on them that are confidential or contain secure information. However, due to the paper jam the papers never reach the secure paper tray and, thus, the information on the documents is compromised. The present disclosure ensures that the documents remain secure even when an error, such as when a paper jam occurs, when power is lost during the print job, or when an unscrupulous individual manually attempts to pause or stop the print job to remove the documents from one or more transport paths within the printer before the documents are outputted to a secure tray.

Figure 1:
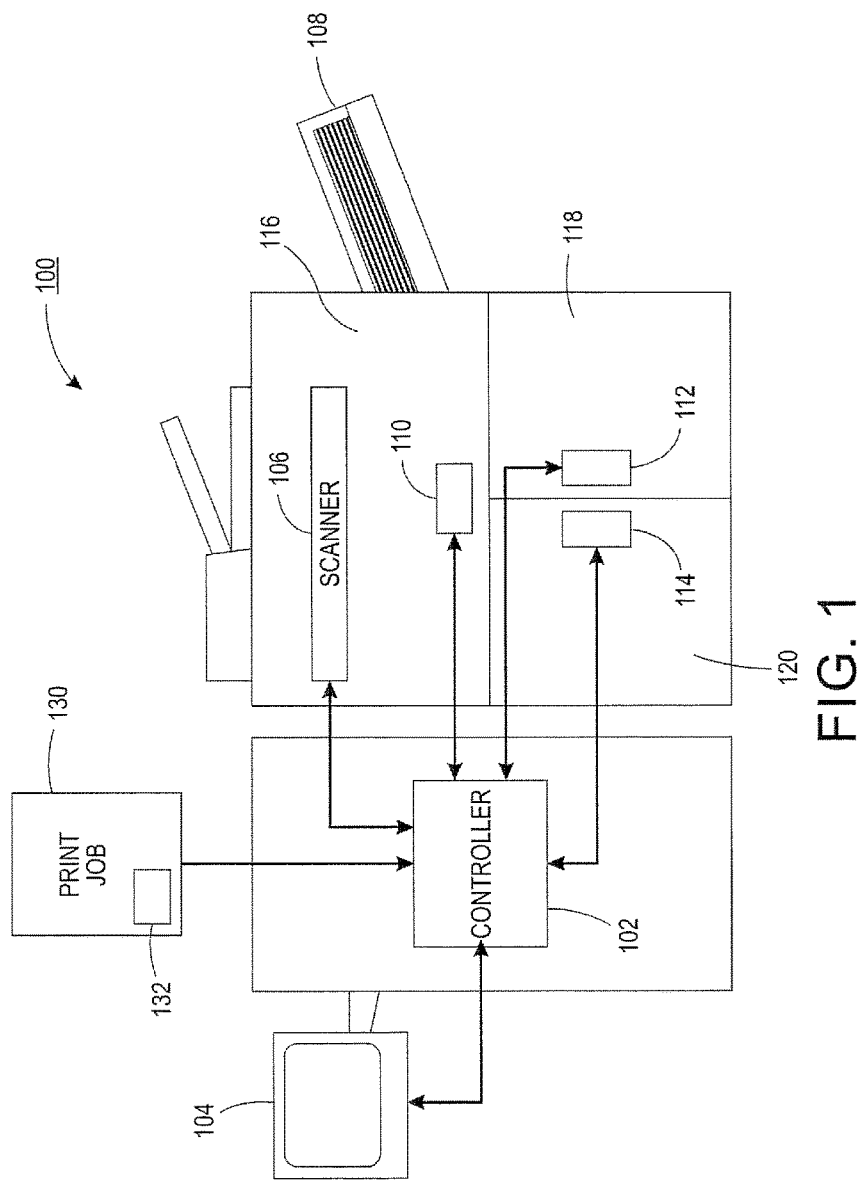
FIG. 1 illustrates an example printer of the present disclosure.

FIG. 1 illustrates an example printer 100 of the present disclosure. In one embodiment, the printer 100 may be a multi-function device (MFD) that performs a scanning function, a printing function, a copying function, a faxing function, and the like. For example, the printer 100 may be an iGen® printer manufactured by Xerox® corporation that is intended to be remotely located and process a large number of print jobs and documents.

In one embodiment, the printer 100 may include a controller 102, a user interface (UI) 104, a scanner 106, a secured paper tray 108, one or more locks 110, 112 and 114 associated with a respective door 116, 118 and 120. In one embodiment, the controller 102 may be a processor that is in communication with the UI 104, the scanner 106 and each one of the locks 110, 112 and 114.

In one embodiment, the controller 102 may receive a print job 130. The print job 130 may be a file or data that is in a format compatible with the communication protocol of the printer 100. The print job 130 may be received by the controller 102 of the printer 100 via either a wired or wireless communication with an endpoint device (not shown) that sent the print job 130.

In one embodiment, the print job 130 may have a tag 132 that indicates the print job 130 includes a secure document. In other words, the document may contain personal information, sensitive financial information, confidential information, and the like. The document may be protected by a Safe Harbor provision and printing the document may require meeting certain security requirements under the Safe Harbor provision.

In one embodiment, the print job 130 may be sent by the endpoint device that is remotely located from the printer 100. In other words, the printer 100 and the endpoint device are at different locations. Said another way, the printer 100 is not within view of a user at the endpoint device that sent the print job 130.

In one embodiment, the tag 132 may be scanned by the scanner 106, read by a digital front end (DFE) or processed by the controller 102. In one embodiment, the tag 132 may provide an indication that the print job includes a secure document.

In one embodiment, when the controller 102 receives an indication that the print job 130 includes a secure document, the controller 102 may send a signal to the locks 110, 112 and 114 to engage the locks on the respective doors 116, 118 and 120. In other words, when the controller 102 receives the indication that the print job 130 includes the secure document, the controller 102 locks all of the doors 116, 118 and 120, access panels, or any other means for entry into the printer 100.

In one embodiment, the doors 116, 118 and 120 may correspond to any area or transport path of the printer 100 that the secure document may travel through when printing. In other words, any portion of a paper path of the printer 100 that is accessible may be covered by one or more doors and secured by a corresponding lock.

In one embodiment, the locks 110, 112 and 114 may be an electro-mechanical lock or mechanism. In other words, the locks 110, 112 and 114 are not a mechanical lock that can be opened with a physical key that is inserted into a key hole of the lock. Notably, a mechanical lock can be easily picked, the physical key can be copied, or the key can be stolen and used by any individual.

Figure 2:
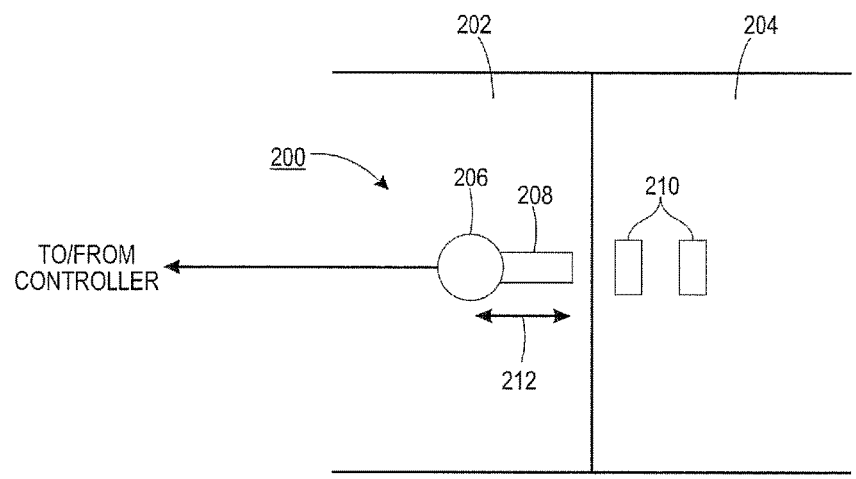
FIG. 2 illustrates an example lock of the present disclosure.

FIG. 2 illustrates an example lock 200 of the present disclosure. For example, the lock 200 may include a solenoid 206 coupled to a piston 208 on a first wall 202 of the printer 100. The solenoid 206 may be in communication with the controller 102 to receive signals that actuate the solenoid 206 to engage and disengage the lock 200.

In one embodiment, a slot 210 may be coupled to a door 204 of the printer 100. FIG. 2 illustrates the lock 200 in a disengaged position. In one embodiment, when a print job 130 with a secure document is detected by the controller 102, the controller 102 may send a signal to the solenoid 206 to move the piston 208 into the corresponding slot 210 to engage the lock 200.

It should be noted that FIG. 2 only illustrates an example electro-mechanical mechanism of the lock 200. Other designs may be used to provide an electro-mechanical lock that does not use a physical key to engage and disengage the lock 200.

As a result, if an error is detected in the printer 100 during the print job 130, an individual would be prevented from entering the printer 100 to confiscate, or view, information on partially printed documents within the various transport paths, nips and rollers within the printer 100. For example, the error may be a paper jam, a power loss or an intentional pausing of the print job.

Referring back to FIG. 1, the locks 110, 112 and 114 remain engaged until a security code is received via the UI 104 when an error is detected in the printer 100. In one embodiment, the UI 104 may be a touch screen or a key pad. The security code may be an alpha numeric code that may be provided to a select individual or a small group of individuals.

In one embodiment, the security code may be changed by selected individuals with security code authority. In one embodiment, the security code may be periodically changed for added security (e.g., daily, hourly, and the like). In one embodiment, the security code may be assigned to an individual so that other individuals cannot "steal" the security code. For example, each user may be assigned an account number to enter into the printer 100. If the account number of the user and the security code assigned to the user do not match, the locks 110, 112 and 114 may remain engaged. Thus, an individual would be required to know the account number and the security code to disengage the locks 110, 112 and 114 and access the secure documents that are jammed.

In one embodiment, the locks 110, 112 and 114 may remain in their current position in case of a power loss (e.g., if locked for a secure document, the locks are in an engaged position and if open for a non-secure document, the locks are disengaged). As a result, an individual could not gain access to the printer 100 by removing power to the printer 100 in the middle of the print job 130.

However, if no error is detected and the print job 130 is completed successfully, then the controller 102 may send a signal to the locks 110, 112 and 114 to disengage the locks 110, 112 and 114. For example, the secure documents may be successfully printed and outputted to the secure paper tray 108 that is locked.

Figure 3:
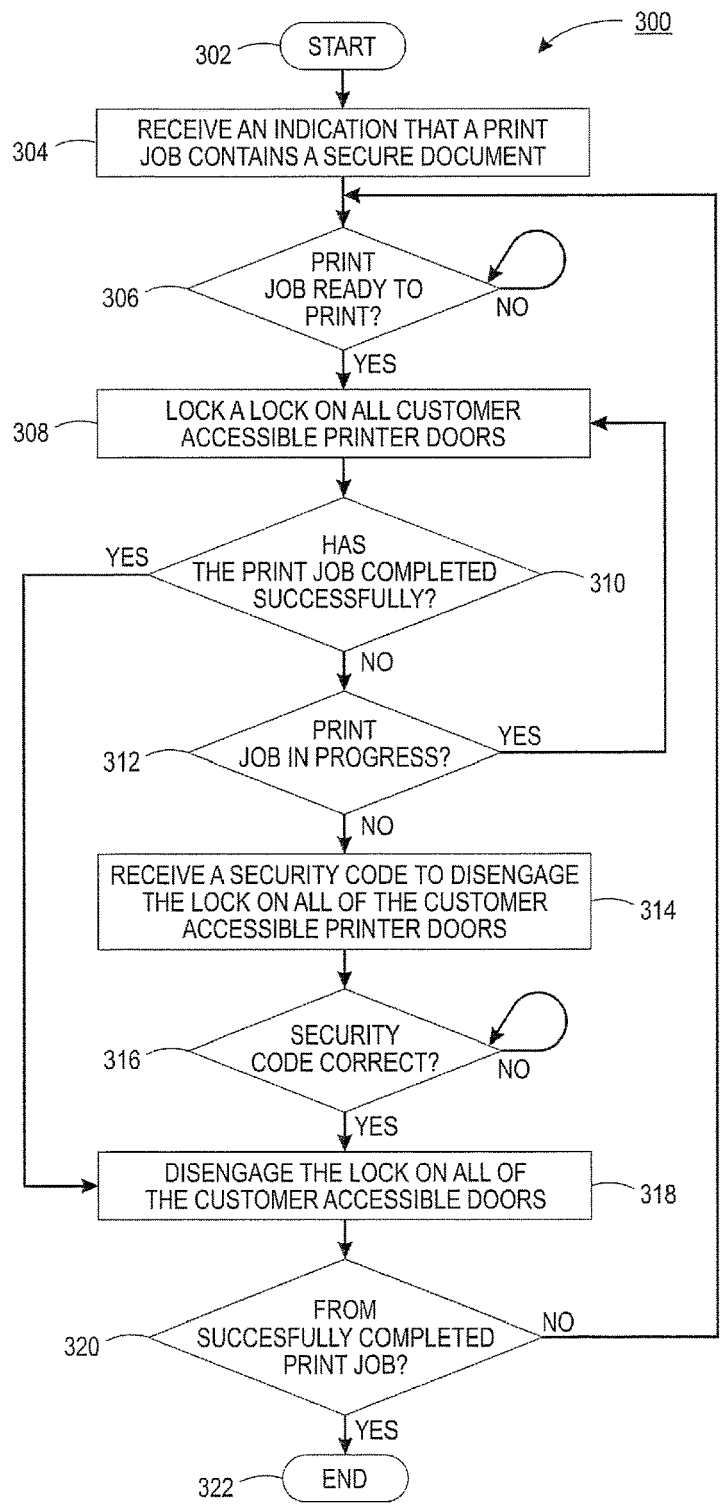
FIG. 3 illustrates an example flowchart of a method for printing a secure document.
Figure 4:
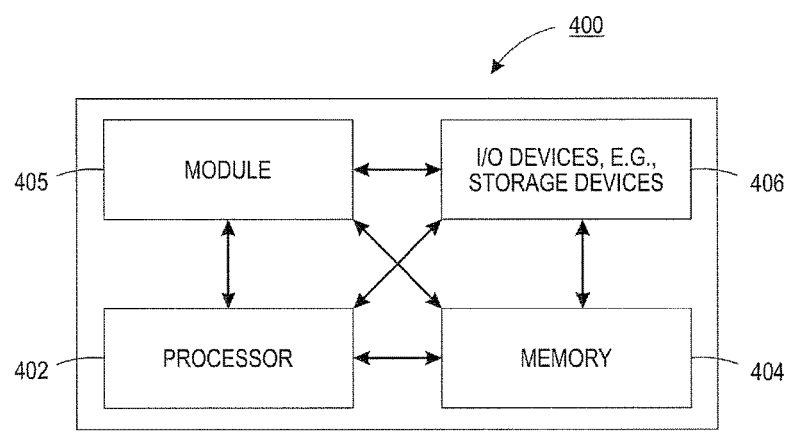
FIG. 4 illustrates a high-level block diagram of a computer suitable for use in performing the functions described herein.

FIG. 3 illustrates a flowchart of a method 300 for printing a secure document. In one embodiment, one or more steps, or operations, of the method 300 may be performed by the printer 100 or a computer as illustrated in FIG. 4 and discussed below.

At block 302 the method 300 begins. At block 304, the method 300 receives an indication that a print job contains a secure document. For example, the print job may have a tag that indicates the print job includes a secure document. In other words, the document may contain personal information, sensitive financial information, confidential information, and the like. The document may be protected by a Safe Harbor provision and printing the document may require meeting certain security requirements under the Safe Harbor provision.

The tag may be scanned by a scanner, read by a DFE or processed by the controller of the printer. The tag provides an indication that the print job includes a secure document.

At block 306, the method 300 may determine if the print job is ready to print. If the print job is not ready to print, the method 300 may continuously loop back to block 306 until the print job is ready to print. When the print job is ready to print, the method 300 proceeds to block 308.

At block 308, the method 300 locks a lock on all customer accessible printer doors in response to the indication that the print job contains the secure document. In one embodiment, the method 300 locks all customer accessible doors, access panels or any other means for entry into the printer 100 to any other areas where either image information or printed information may reside. Said another way, any area, portion or part of the paper path of the printer may be covered by a door and secured with a corresponding lock such that no portion of the paper path may be accessed in case of an error. For example, a signal may be sent to a solenoid of the lock coupled to a wall or a door to actuate a piston such that the piston moves into a corresponding slot on an opposite wall or door.

At block 310, the method 300 determines if the print job completed successfully. If the print job completed successfully without error, the method 300 proceeds to block 318. If the print job has not completed successfully, the method 300 proceeds to block 312.

At block 312, the method 300 determines whether the print job is still in progress. If the print job is still in progress, then the method 300 returns to block 308 and the blocks 308 and 310 are repeated or maintained. If the print job is not in progress, then an error has occurred. For example, the error may be a paper jam, a power loss, an intentional pausing of the print job, and the like. The method 300 proceeds to block 314.

At block 314, the method 300 receives a security code to clear the error and disengage the lock on all of the customer accessible printer doors. For example, an individual that is provided with the security code may enter the security code via the UI of the printer.

In one embodiment, the UI may require the individual with the security code to enter the security code for each door separately to track the progress of the individual. For example, to ensure that all doors are checked and that no secure documents are inadvertently left in the printer, the UI may require the individual to access each door one at a time with the security code. The printer may be operated again only when all of the doors with locks are accessed via separate entries of the security code.

At block 316, the method 300 determines if the security code is correct. If the security code is not correct, the method 300 continuously loops to block 316 until the security code is correct. If the security code is correct at block 316, then the method 300 may proceed to block 318. For example, when the correct security code is entered, the locks may be disengaged and the user may clear the error. For example, jammed paper may be removed from one or more of the transports, nips or rollers of the printer and securely shredded or disposed of. In another example, the printer 100 may be repaired to restore power.

At block 318, the method 300 disengages the lock on all of the customer accessible doors. For example, the controller may send a signal to the solenoid of each one of the locks that are engaged to move the piston out of the corresponding slot. Once the piston is moved out of the corresponding slot, the lock may be disengaged and the doors may be opened.

At block 320, the method 300 determines whether the locks were disengaged from a successfully completed print job (e.g., from block 310). If the answer is no (e.g., from block 316), then the method 300 returns to block 306 and blocks 306-320 are repeated. For example, the lock on all of the customer accessible doors were disengaged due to a security code that was entered to clear an error. As a result, the print job did not complete successfully and must be re-printed or resume printing from where the print job was stopped due to the error.

However, if the answer is yes (e.g., from block 310), then the method 300 proceeds to block 322. At block 322, the method 300 ends.

It should be noted that although not explicitly specified, one or more steps, functions, or operations of the method 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps, functions, or operations in FIG. 3 that recite a determining operation, or involve a decision, do not necessarily require that both branches of the determining operation be practiced. In other words, one of the branches of the determining operation can be deemed as an optional step.

FIG. 4 depicts a high-level block diagram of a computer that can be transformed to into a machine that is dedicated to perform the functions described herein. As depicted in FIG. 4, the computer 400 comprises one or more hardware processor elements 402 (e.g., a central processing unit (CPU), a microprocessor, or a multi-core processor), a memory 404, e.g., random access memory (RAM) and/or read only memory (ROM), a module 405 for printing a secure document, and various input/output devices 406 (e.g., storage devices, including but not limited to, a tape drive, a floppy drive, a hard disk drive or a compact disk drive, a receiver, a transmitter, a speaker, a display, a speech synthesizer, an output port, an input port and a user input device (such as a keyboard, a keypad, a mouse, a microphone and the like)). Although only one processor element is shown, it should be noted that the computer may employ a plurality of processor elements. Furthermore, although only one computer is shown in the figure, if the method(s) as discussed above is implemented in a distributed or parallel manner for a particular illustrative example, i.e., the steps of the above method(s) or the entire method(s) are implemented across multiple or parallel computers, then the computer of this figure is intended to represent each of those multiple computers. Furthermore, one or more hardware processors can be utilized in supporting a virtualized or shared computing environment. The virtualized computing environment may support one or more virtual machines representing computers, servers, or other computing devices. In such virtualized virtual machines, hardware components such as hardware processors and computer-readable storage devices may be virtualized or logically represented.

It should be noted that the present disclosure can be implemented in software and/or in a combination of software and hardware, e.g., using application specific integrated circuits (ASIC), a programmable logic array (PLA), including a field-programmable gate array (FPGA), or a state machine deployed on a hardware device, a computer or any other hardware equivalents, e.g., computer readable instructions pertaining to the method(s) discussed above can be used to configure a hardware processor to perform the steps, functions and/or operations of the above disclosed methods. In one embodiment, instructions and data for the present module or process 405 for printing a secure document (e.g., a software program comprising computer-executable instructions) can be loaded into memory 404 and executed by hardware processor element 402 to implement the steps, functions or operations as discussed above in connection with the exemplary method 300. Furthermore, when a hardware processor executes instructions to perform "operations," this could include the hardware processor performing the operations directly and/or facilitating, directing, or cooperating with another hardware device or component (e.g., a co-processor and the like) to perform the operations.

The processor executing the computer readable or software instructions relating to the above described method(s) can be perceived as a programmed processor or a specialized processor. As such, the present module 405 for printing a secure document (including associated data structures) of the present disclosure can be stored on a tangible or physical (broadly non-transitory) computer-readable storage device or medium, e.g., volatile memory, non-volatile memory, ROM memory, RAM memory, magnetic or optical drive, device or diskette and the like. More specifically, the computer-readable storage device may comprise any physical devices that provide the ability to store information such as data and/or instructions to be accessed by a processor or a computing device such as a computer or an application server.

It will be appreciated that variants of the above-disclosed and other features and functions, or alternatives thereof, may be combined into many other different systems or applications. Various presently unforeseen or unanticipated alternatives, modifications, variations, or improvements therein may be subsequently made by those skilled in the art which are also intended to be encompassed by the following claims.

What is claimed is:

1. A printer for printing a secure document, comprising:
   a controller for receiving an indication that a print job contains the secure document;
   a respective lock on each one of a plurality of printer doors of the printer, wherein the respective lock of the each one of the plurality of printer doors is electrically coupled to the controller, wherein the respective lock is engaged by the controller after receiving the indication that the print job contains the secure document and the respective lock is disengaged when the print job is completed successfully;
   a user interface in communication with the controller for receiving an account number and a security code associated with the account number to disengage the respective lock on the each one of the plurality of printer doors when the print job is interrupted due to an error, wherein the controller tracks a progress of whether the respective lock is opened on the each one of the plurality of printer doors via the security code that is entered separately for the each one of the plurality of printer doors to ensure that the each one of the plurality of printer doors has been checked such that the secure document is not left in the printer;
   a scanner in communication with the controller for scanning a tag that provides the indication to the controller that the print job contains the secure document; and
   a digital front end to read the tag that is scanned by the scanner.

2. The printer of claim 1, wherein the respective lock on the each one of the plurality of printer doors comprises an electro-mechanical mechanism.

3. The printer of claim 2, wherein the electro-mechanical mechanism comprises a solenoid coupled to a piston on a first wall of the printer, wherein when the solenoid is energized by a signal from the controller, the piston is moved into a corresponding slot coupled to the printer door of the printer.

4. The printer of claim 1, wherein the user interface comprises a touch screen or an alphanumeric keypad of the printer.

5. The printer of claim 1, wherein the error comprises a paper jam.

6. The printer of claim 1, wherein the error comprises a pausing of the print job.

7. The printer of claim 1, wherein the printer is remotely located from an endpoint device that sent the print job and is used to print documents under a Safe Harbor provision.

8. A method for printing a secure document, comprising:
   scanning, by a scanner of a printer, a tag associated with a print job;
   reading, by a digital front end of the printer, the tag that is scanned indicating that the print job contains the secure document;
   receiving, by a processor of the printer, an indication that the print job contains the secure document;
   locking, by the processor, a respective lock on all customer accessible printer doors in response to the indication that the print job contains the secure document;
   determining, by the processor, that an error has occurred during the print job;
   receiving, by the processor, an account number and a security code associated with the account number to clear the error and disengage the respective lock on each one of the all customer accessible printer doors; and
   tracking, by the processor, a progress of whether the respective lock is opened on the each one of the all customer accessible printer doors via the security code that is entered separately for the each one of the all customer accessible printer doors to ensure that the each one of the all customer accessible printer doors has been checked such that the secure document is not left in the printer.

9. The method of claim 8, further comprising:
   determining, by the processor, that the print job completed successfully; and
   disengaging, by the processor, the respective lock on the each one of the all customer accessible printer doors.

10. The method of claim 8, wherein the respective lock on the each one of the all customer accessible printer doors comprises an electro-mechanical mechanism.

11. The method of claim 10, wherein the electro-mechanical mechanism comprises a solenoid coupled to a piston on a first wall of the printer, wherein when the solenoid is energized by a signal from the processor, the piston is moved into a corresponding slot coupled to a door of the all customer accessible printer doors of the printer.

12. The method of claim 8, wherein the security code is received via a touch screen or an alphanumeric keypad of the printer.

13. The method of claim 8, wherein the error comprises a paper jam.

14. The method of claim 8, wherein the error comprises a pausing of the print job.

15. The method of claim 8, wherein the printer is remotely located from an endpoint device that sent the print job and is used to print documents under a Safe Harbor provision.

16. A printer for printing a secure document, comprising:
   a controller for receiving a print job from a remotely located endpoint;
   a scanner in communication with the controller for scanning a tag on the secure document that provides an indication to the controller that the print job contains the secure document;
   a respective electro-mechanical lock on all customer accessible printer doors of the printer, except a paper tray, that cannot be opened with a physical key in communication with the controller, wherein the respective electro-mechanical lock is electrically coupled to the controller, wherein the respective electro-mechanical lock is engaged by the controller after receiving the indication that the print job contains the secure document and the respective electro-mechanical lock is disengaged when the print job is completed successfully;
   a user interface in communication with the controller for receiving an account number and a security code associated with the account number to disengage the respective electro-mechanical lock on each one of the all customer accessible printer doors when the print job is interrupted due to a paper jam, wherein the controller tracks a progress of whether the respective electro-mechanical lock is opened on the each one of the all customer accessible printer doors via the security code that is entered separately for the each one of the all customer accessible printer doors to ensure that the each one of the all customer accessible printer doors has been checked such that the secure document is not left in the printer;

a scanner in communication with the controller for scanning a tag that provides the indication to the controller that the print job contains the secure document; and a digital front end to read the tag that is scanned by the scanner.

17. The printer of claim 16, wherein the respective electro-mechanical lock comprises a solenoid coupled to a piston on a first wall of the printer, wherein when the solenoid is energized by a signal from the controller, the piston is moved into a corresponding slot coupled to a door of the all customer accessible printer doors of the printer.

18. The printer of claim 16, wherein the respective electro-mechanical lock comprises a default lock setting in case of a power failure.

19. The printer of claim 16, wherein the user interface comprises a touch screen or an alphanumeric keypad of the printer.

* * * * *